United States Patent [19]
Haller et al.

[11] Patent Number: 5,978,957
[45] Date of Patent: Nov. 2, 1999

[54] VERY FAST PIPELINED SHIFTER ELEMENT WITH PARITY PREDICTION

[75] Inventors: Wilhelm Haller, Remshalden; Klaus Getzlaff, Schönaich; Erwin Pfeffer, Holzgerlingen; Ute Gaertner, Schönaich; Günter Gerwig, Simmozheim, all of Germany

[73] Assignee: International Business Machines Corporation, Armonk, N.Y.

[21] Appl. No.: 08/765,003

[22] PCT Filed: Apr. 18, 1995

[86] PCT No.: PCT/EP95/01456

§ 371 Date: Jul. 14, 1997

§ 102(e) Date: Jul. 14, 1997

[87] PCT Pub. No.: WO96/33455

PCT Pub. Date: Oct. 24, 1996

[51] Int. Cl.[6] .................................................... G06F 11/10
[52] U.S. Cl. ........................ 714/803; 714/799; 714/800
[58] Field of Search ................................. 371/49.4, 49.1, 371/48; 714/799, 800, 803

*Primary Examiner*—Phung M. Chung
*Attorney, Agent, or Firm*—Marc A. Ehrlich

[57] ABSTRACT

A shifting structure and method which separates a shifting operation into partial shifts which may be executed in different pipeline staged is described herein. In a first pipe stage, an operand is read out and at least one partial shift is accomplished by placing the operand or parts thereof into registers coupled to a shift unit. The shift unit, in a second pipe stage, finalizes the shifting operation executing the remaining partial shifts, thereby reducing the time required for the total shifting operation. A control string is derived in the shift unit based on the shift amount to correct the output of the shifted result as well as providing for parity prediction therefor.

20 Claims, 6 Drawing Sheets

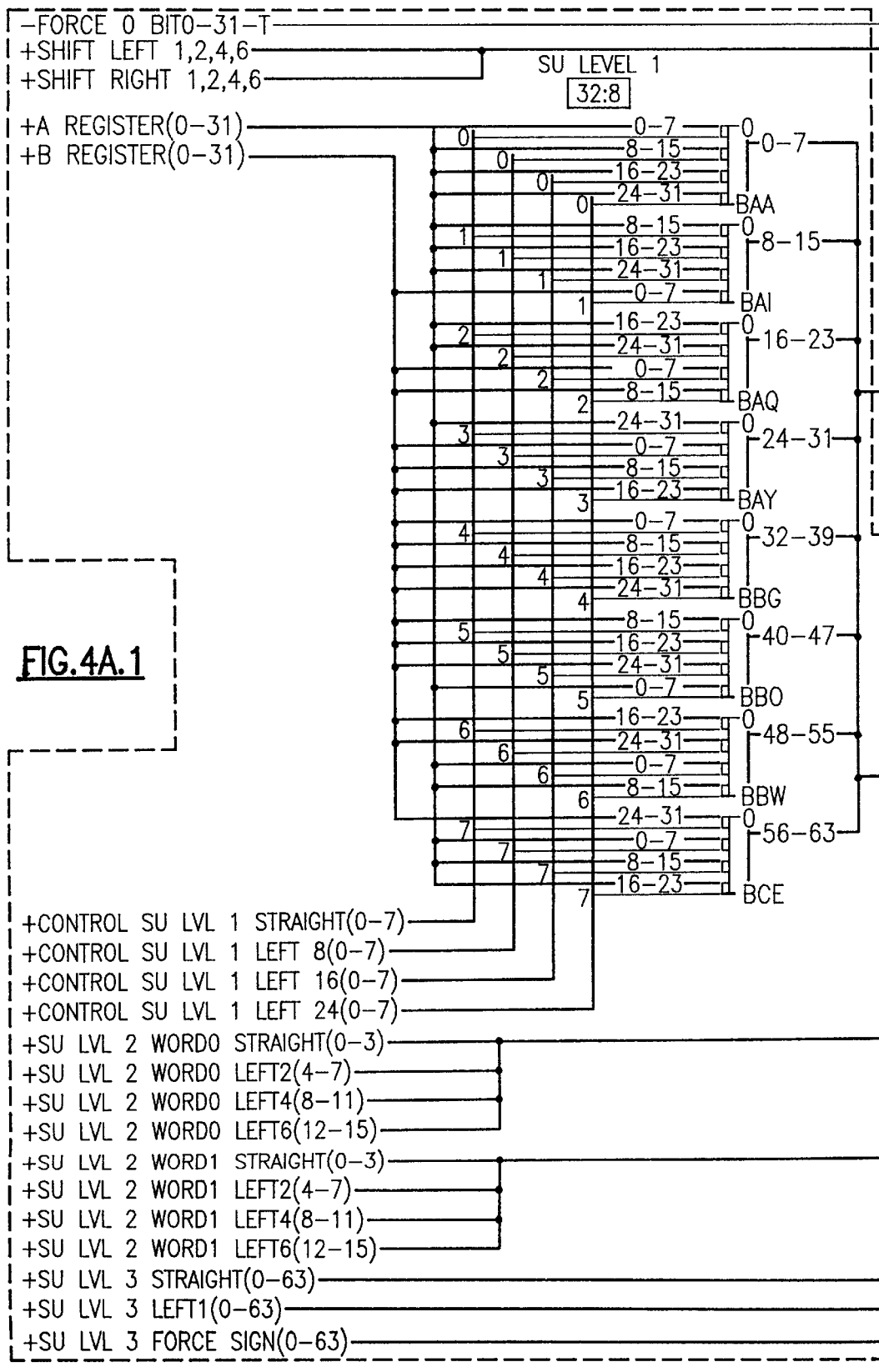
FIG.4A.1

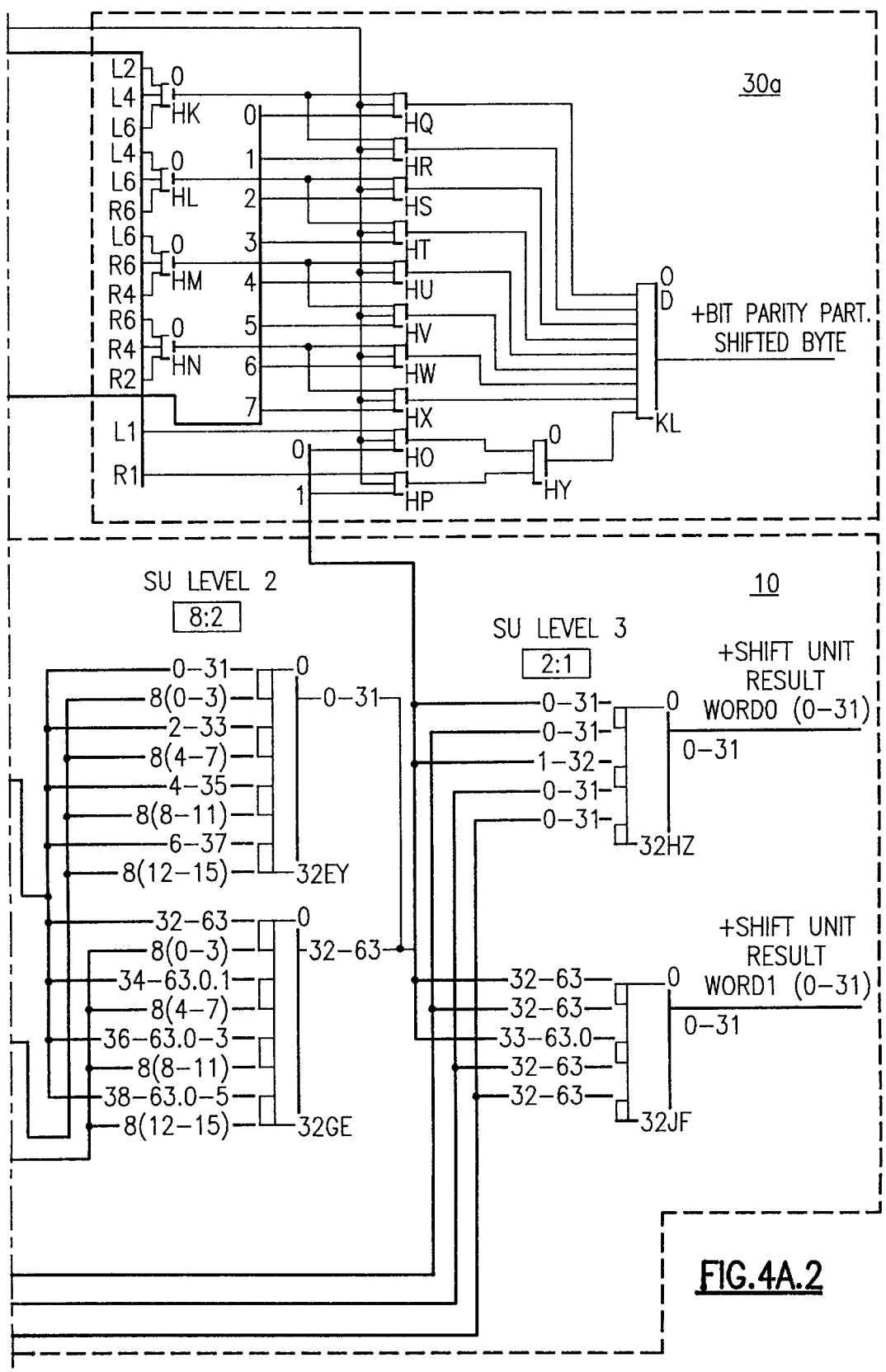
FIG.4A.2

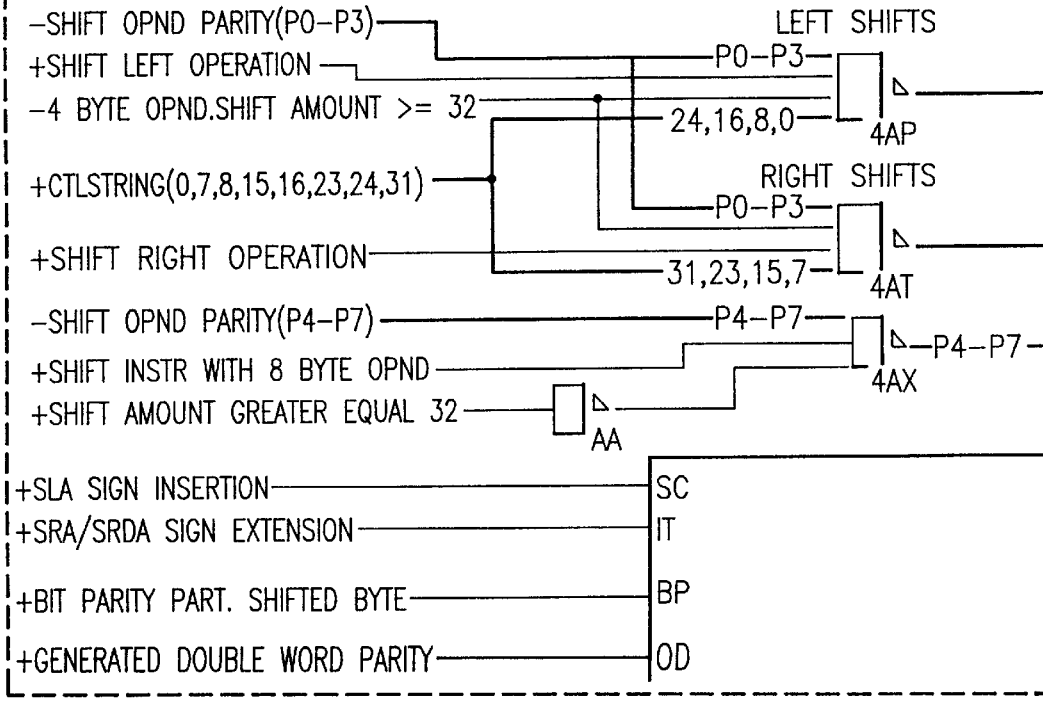
FIG.4B.1

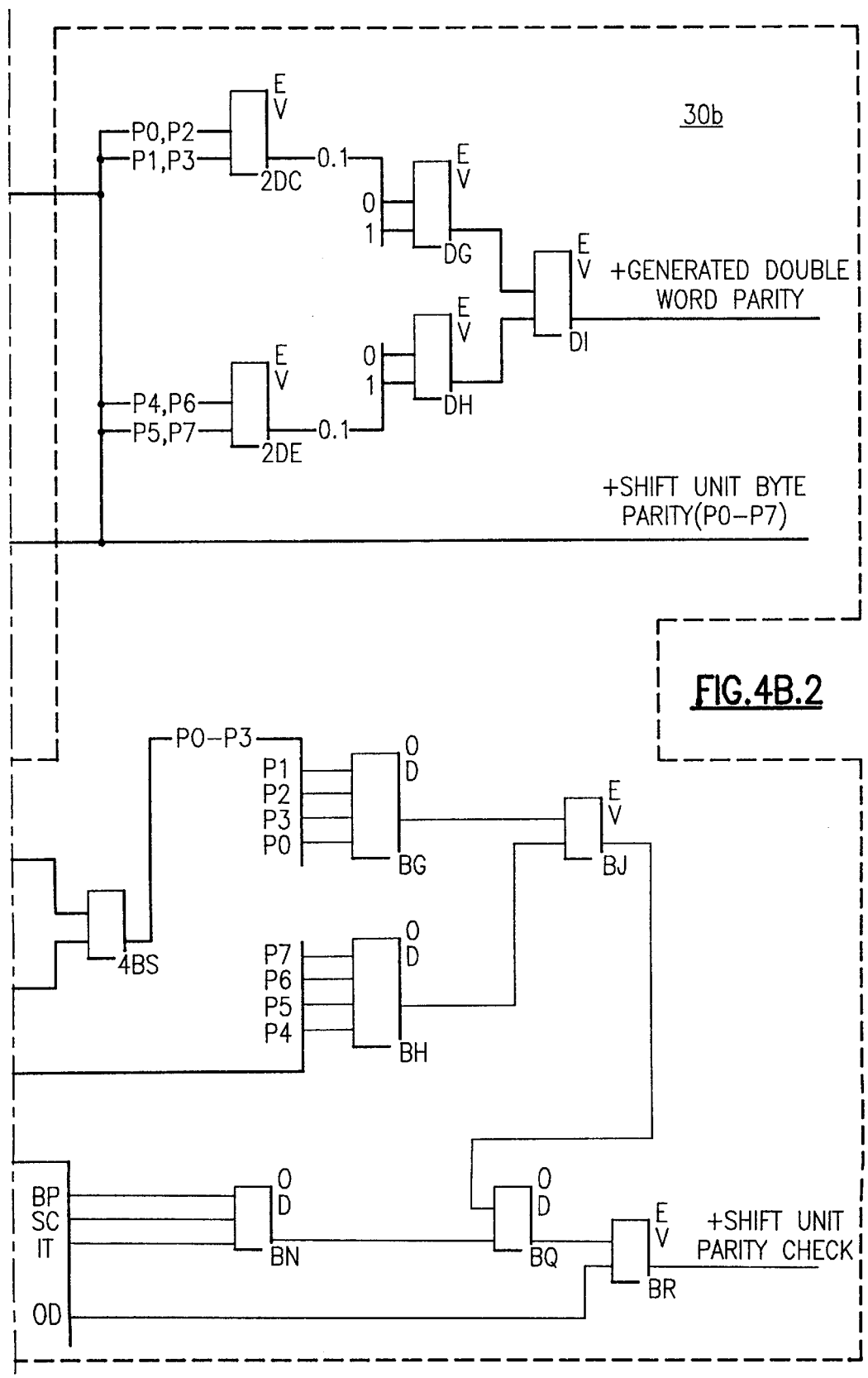
FIG.4B.2

VERY FAST PIPELINED SHIFTER ELEMENT WITH PARITY PREDICTION

FIELD OF THE INVENTION

The invention relates to shifting of an operand in a shifting unit.

PRIOR ART

A shift register, or shift unit, has the ability to transfer information in a lateral direction. Shift registers normally represent n-stage devices whose output consist of an n-bit parallel data word. Application of a single clock cycle to the shift register device causes the output word to be shifted by one bit position from right to left (or from left to right). The leftmost (or rightmost) bit is lost from the "end" of the register while the rightmost (or leftmost) bit position is loaded from a serial input terminal.

Shift registers with parallel outputs, and with combinational logic fed from those outputs, are of great importance in digital signal processing, and in the encoding and decoding of error-correcting and error-detecting codes. Such registers may be implemented in hardware or in software, and may be binary or q-ary. (Hardware implementation is usually convenient only for binary and sometimes ternary logic.)

Shift units are commonly used together with arithmetical and logical units. FIG. 1 shows a block diagram of a prior art execution unit comprising a shift unit together with an arithmetical and a logical unit. All those units generally have to match in speed in order to avoid having unbalanced net length and signal propagation time. However, particularly the shift unit appears to be critical in matching the speed of the arithmetical and logical unit.

In certain applications, in order to provide a check on a group of binary values (e.g. a word, byte, or character), a parity function is commonly computed by forming the modulo-2 sum of the bits in the group. The generated sum, a redundant value, is called the parity bit. The parity bit is 0 if the number of 1s in the original group was even. The parity bit is 1 if the number of 1s in the original group was odd.

The parity computation just defined will cause the augmented group of binary values (the original group plus the parity bit) to have an even number of 1s; this is called even parity. In some cases, hardware considerations make it desirable to have an odd number of 1s in the augmented group, and the parity bit is selected to cause the total number of 1s to be odd; this is called odd parity. A parity check, or odd-even-check, is the computation, or recomputation for verification, of a parity bit to determine if a prescribed parity condition is present.

Shift units in applications comprising a parity function have to restore the parity after each shifting operation since the sum of bits in a respective group might have been changed. This is generally accomplished by a parity generation subsequent to the shifting operation. As an additional security feature some applications further comprise a parity prediction function predicting the new parity bits independently from the parity generation of the shift unit. The generated and the predicted parity bits are compared and a defect in either the parity generation or prediction unit in case of a non-matching of both parity bits is apparent. However, such parity analysis require a certain amount of processing time and are consequently especially critical with respect to a demanded matching in timing with other processing units.

As shown in FIG. 1, the operand to be shifted (e.g. 4 or 8 byte) is generally read from a Data Local Store DLS and put into operand registers A REG or B REG. In a next cycle the data are processed in either one of the processing units, e.g. shifted, and written back to the Data In Register DI of the DLS. In parity checked systems a byte parity, e.g. the byte parity P0–P7, of the shifted data is generated adding additional delay to the shifter path.

Shift operations usually, e.g. in IBM S/390 based computers (IBM and S/390 are registered trademarks of International Business Machines Corporation) perform 4 or 8 byte shifts, right or left as logical or arithmetical operations. In addition a whole variety of special micro instructions are usually executed by the shift unit. The shift amount is commonly split into 32–16–8–4–2–1 bit shifting elements (e.g. when multiplexers with up to 4 inputs are comprised) which are passed through in consecutive order. Shift amounts between 0 and 63 bits are thus possible. Levels may be bypassed by passing straight through. Shifting to the right or left is done by applying the appropriate multiplexer levels for shifting right/left.

Parity checking for the data path is commonly achieved by generating the byte parity. For parity prediction, a parity bit of the complete double word (8 byte) is generated and compared with a predicted double word parity bit. The predicted parity bit is achieved by selecting the byte parity bits of the bytes which are not shifted out. Other bytes are completely shifted out and replaced by zeroes, and one byte may be partially affected by the shift (1 to 7 bits of a byte may be shifted out).

Applying this scheme for odd-parity, the predicted parity is composed of the remaining byte parity bits, 1's for the byte parity bits which are completely shifted out and replaced by zeroes (odd parity assumed), and the parity bit of the byte which is partially shifted. The original parity bit of the partially shifted byte is flipped by each of its 1's which are shifted out.

Shift units for shifting up to 64 bits are generally composed of 6 multiplexer levels and 2 XOR levels for parity generation. Shift units for shifting up to 32 bits are composed of 5 multiplexer levels and 2 XOR levels for parity generation. For parity prediction additional logic levels are necessary.

The shift amount in byte (8 bit) oriented systems is commonly split into 1–2–4–8–16–32–. . . –k/4–k/2 bit shifting elements which are passed through in consecutive order, usually starting with the largest shift amount, so that shift amounts between 0 and k–1 bits in total are thus possible. Shift amounts>=k for k bit words are usually meaningless since the word is then shifted out and represents 0's independent from the actual shift amount. However, the signals have to pass through several levels of logic until the wanted result can be received. This is quite time consuming and a great disadvantage.

SUMMARY OF THE INVENTION

It is an object of the invention to provide an improved shift unit.

The object of the invention is solved by the independent claims.

A new functional unit is introduced which is able to shift data in various ways, and to perform also a truncation of data, either on the left or on the right side. Speed advantage is achieved by exploiting pipelining, i.e. the execution is split into multiple cycles. All operations can be parity checked by predicting the correct parity.

In very general terms, the invention introduces a shifting structure which separates a shifting operation into partial shifts which can be executed in different pipeline stages. In a first pipe stage, an operand is read out and at least one partial shift is accomplished by placing the operand or parts of the operand into registers coupled to a shift unit. The shift unit, in a second pipe stage, eventually finalises the shifting operation by executing the remaining partial shifts. This reduces the time required for the shifting operation in total and also allows to distribute the partial shifts into the different pipeline stages in order to use a possible remaining period of time in a cycle.

Further reductions of the time required for the shifting operation in the second cycle can be accomplished by a shift unit according to the invention.

In the shift unit according to the invention, the operand to be shifted is read, in a first pipe (pipeline) stage, from a data store and put into one of two operand registers, each k/2 bits long, whereby k represents an integer value. In a next cycle the data is processed, in a second pipe stage, in the k bits long shift unit, and written back to a data register. An optional parity generation unit and an optional parity prediction unit can also be applied to the shift unit of the invention.

The shift structure according to the invention splits up the shifting into both of the two pipe stages. The data store contains data, with each maximum of k/2 bit length, which can be read individually or as pairs with k bit length. The data store further comprises a multiplexing unit allowing to place each one of the data on either one of the operand registers.

The functioning of the multiplexing unit is part of the shifting function and controlled by an instruction control unit as known in the art. The multiplexing unit can provide a k/2 bit shifting by placing each one of the k/2 bit data to be shifted in either one of the operand registers and therefore on either the right or left side of the k bit shift unit, thus representing a k/2 bit shifting element. Consequently, the shift unit of the invention only requires 1–2–4–8–16–32–... –k/4 bit shifting elements, thus saving one shifting element, and ergo one shift level, with respect to shift units as known in the art.

When a k bit word, comprised of two k/2 data words from the data store, is to be shifted with a shift amount>=k/2 to the left (right), only the rightmost (leftmost) k/2 data word needs to be read into the most left (right) one of the operand register, already representing a k/2 shift, during the cycle in the first pipe stage. Consecutive shifting is then applied by the shift unit during the next cycle in the second pipe stage. Since the shift amount k/2 is already implemented in the first pipe stage, only shift amounts with in total k/2–1 are required in the consecutive shift unit of the second pipe stage.

Shifting with a shift amount<k/2 to the left or right is applied by only the shift unit during the cycle in the second pipe stage.

It is to be understood that the shift structure of the present invention is not limited to only k/2 shifts in the first pipe stage. The data can also be read out individually or in a combination into a plurality of operand registers. The multiplexing unit then places the read out data to be shifted in the plurality of operand registers. Dependent on the number of operand registers and their respective bit length, various possibilities of shifts can be accomplished. If, for example, four operand registers are provided, k/4 and/or k/2 shifts can be effected. It is to be understood that the number of shift levels and the shift amounts in each of the pipe stages depends on the time period provided in each cycle.

In order to further reduce the number of shift levels and thus the time required for a shifting operation, the shift unit of the present invention preferably executes shifting operations in only one direction, e.g. only to the left. The operand bits are shifted in a circular manner. Shift operations to the opposite direction are done by shifting left with a complement shift amount.

The shifting in a shift unit with a circular shift manner can be divided into consecutive shift levels. Each shift level generally allows a certain maximum number of shift gates n, p, q, etc. each with different shift amounts, whereby n, p, q, etc. represent integer values. For example when CMOS technology is applied the maximum number of shift gates usually is limited to four.

A first shift level allowing maximum n shift gates with the following shift amounts: 0, k/(2n), 2 * k/(2n), 3 * k/(2n), 4 * k/(2n), ..., (n−2) * k/(2n), (n−1) * k/(2n), each with a distance of k/(2n) between two shifting amounts next to each other. A second shift level allows maximum p shift gates with the shift amounts: 0, k/(2np), 2 * k/(2np), 3 * k/(2np), 4 * k/(2np), ..., (p−2) * k/(2np), (p−1) * k/(2np), each with a distance of k/(2np) between two shifting amounts next to each other. A third shift level allows maximum q shift gates with the shift amounts: 0, k/(2npq), 2 * k/(2npq), 3 * k/(2npq), 4 * k/(2npq), ..., (q−2) * k/(2npq), (q−1) * k/(2nq), each with a distance of k/(2npq) between two shifting amounts next to each other. Each consecutive shift level divides the distance between two shifting amounts next to each other into k/(2π), whereby π represents the product of the maximum shift gates of the preceding until present shift levels. It is clear that each shifting amount can only be an integer value and that the last shift level ends with a shifting amount of 1.

As apparent from the above, the shift unit according to the invention reduces the number of shifting levels at least by one. However, shift units with a circular shift manner allow a further remarkable reduction of the shift levels. As an additional feature required when k/2 bit data have to be shifted is a duplication function within the multiplexing unit in the first pipe, allowing to duplicate the contents from the operand registers.

The resulting data of the circular shift operation often need further manipulation in order to receive the same result as from a linear shift operation, e.g. leading/trailing zeroes or sign extension. Linear shifting of a data ABCD EFGH (with A to H representing an individual byte) results in the remaining bits of the original data filled up with additional 0's for the shift out bits. As an example, a shift 24 (24 bits or 3 bytes) to the right for the data ABCD EFGH would result in the new data 000A BCDE. However, shifting in a circular manner in that example would result in FGHA BCDE and consequently requires a certain treatment in order to receive the same result as from the linear shifting. Such a treatment is preferably done by an individual string of bit values as a control string comprised of bit or byte values correcting the circular shift result into a linear shift result. The shift amount is decoded to the string which defines the valid bits of the shift result.

The string also allows to control the optional parity prediction. It defines the validity of the data and optionally selects the parity bits for the parity prediction. The application of the string distinguishedly reduces the amount of control logic required.

For the optional parity prediction, it is to be understood that the counting of the 1's which are shifted out of the partially shifted byte can preferably accomplished only on one side, preferably the side to which the bits are shifted to in a circular manner. This requires a certain treatment of the data in the first pipeline stage, e.g. duplication of the data. This reduces the amount of logic circuits to be passed through in the parity prediction logic.

The shift structure of the invention can be used e.g. in an execution unit for executing data manipulations in a processor unit which can be part of a processor chip.

DESCRIPTION OF THE DRAWINGS

The invention will now be described by way of example and with reference to the accompanying drawings in which.

DETAILED DESCRIPTION OF THE INVENTION

Figure 1:
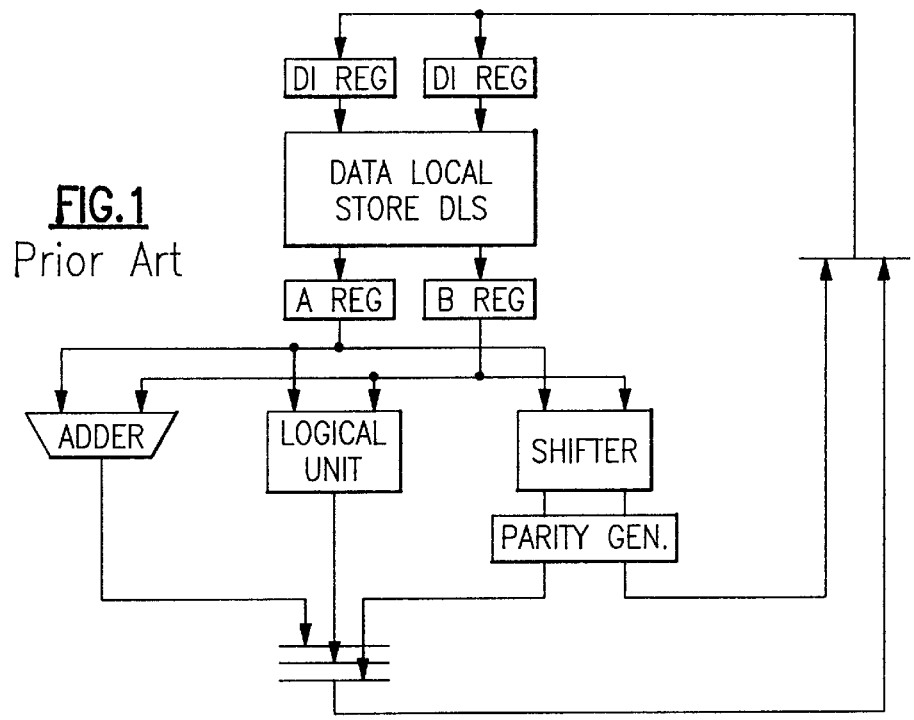
FIG. 1 shows a block diagram of a prior art execution unit comprising a shift unit together with an arithmetical and a logical unit.
Figure 2:
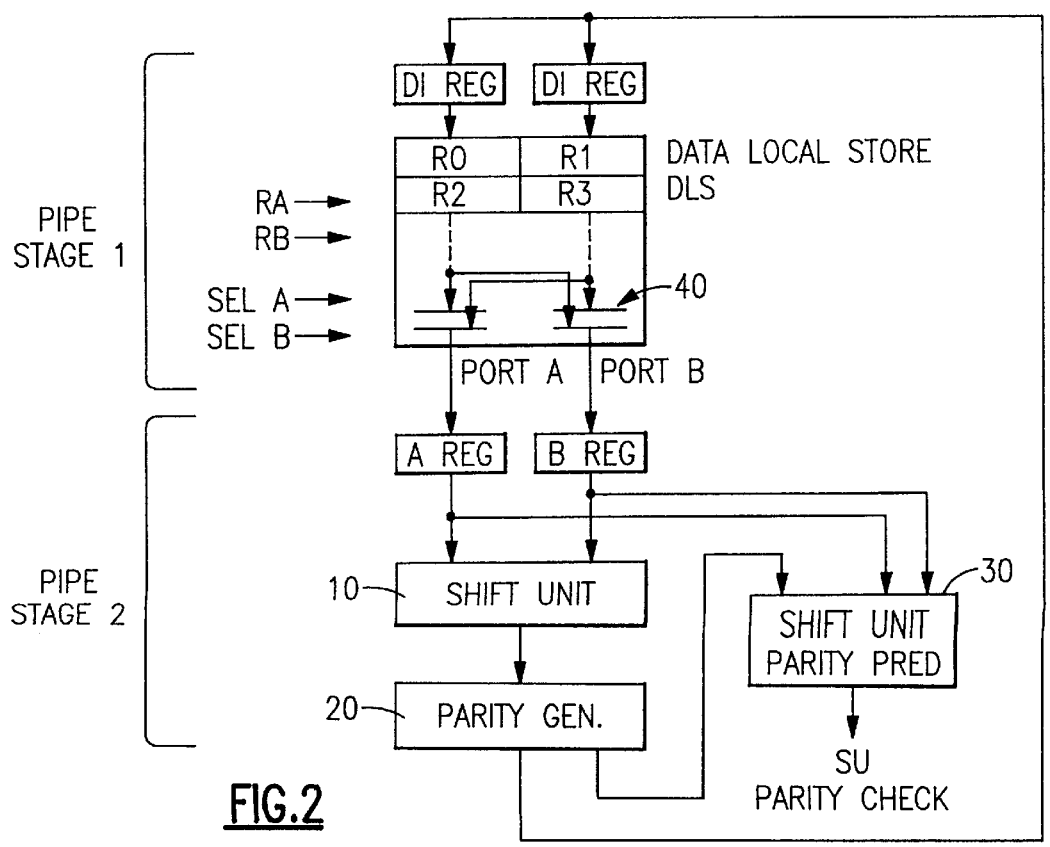
FIG. 2 shows a shifting unit according to the invention.

FIG. 2 shows a shifting unit according to the invention. It is to be understood that the shift unit of FIG. 2 can be part of the execution unit of FIG. 1. As already shown in FIG. 1, the operand to be shifted is read out, in pipe stage 1, from the Data Local Store DLS and put into the operand registers A REG or B REG, each k/2 bits long. In a next cycle the data are processed, in pipe stage 2, in a shift unit 10, and written back to the Data In Register DI of the DLS. FIG. 2 further shows an optional parity generation unit 20 and an optional parity prediction unit 30. Those functions will be explained later.

The shift structure according to the invention splits up the shifting into both of the two pipe stage 1 and 2. The data local store DLS contains data R0, R1, R2, R3, etc. with each maximum of k/2 bit length which can be read individually or as pairs with k bit length. The data local store DLS further comprises a multiplexing unit 40 allowing to place each one of the data R0, R1, R2, R3, etc. on either register A REG or B REG.

The functioning of the multiplexing unit 40 is already part of the shifting function and controlled by an instruction control unit, not shown herein, as known in the art. The multiplexing unit 40 provides a k/2 bit shifting and therefore represents the k/2 bit shifting element. Consequently, the shift unit 10 of the invention only requires 1–2–4–8–16–32–. . . –k/4 bit shifting elements, thus saving one shifting element, and ergo one shift level, with respect to shift units as known in the art.

When a k bit word, comprised of two k/2 data words from the data local store DLS, is to be shifted with a shift amount >=k/2 to the left (right), only the rightmost (leftmost) k/2 data word needs to be read into register A REG (B REG), already representing a k/2 shift, during the cycle in pipe stage 1. Consecutive shifting is then applied by the shift unit 10 during the next cycle in pipe stage 2.

The shift unit 10 of an embodiment of the invention only executes shifting operations in one direction, i.e. only to the left. The operand bits are shifted in a circular manner. Further manipulation of the resulting data need, e.g. leading/trailing zeroes or sign extension, is preferably done by a control string, which is explained later. Shift operations to the opposite direction are done by shifting left with a complement shift amount CSA.

Figure 3:
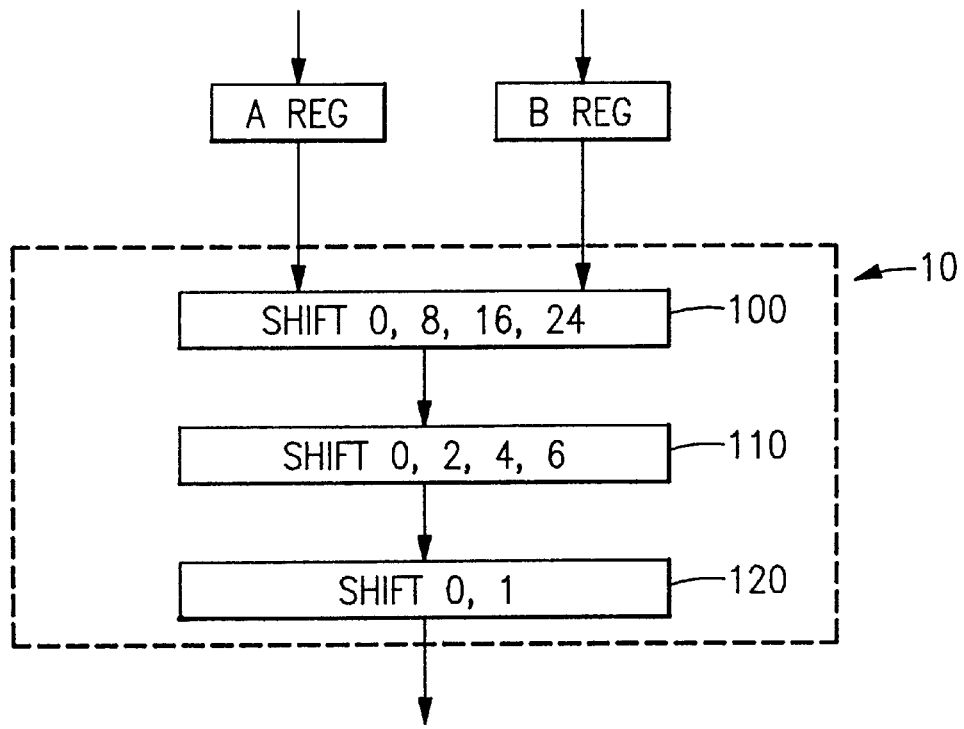
FIG. 3 shows the structure of one embodiment of the shift unit 10 with a circular shift manner.

FIG. 3 shows the structure of one embodiment of the shift unit 10 with a circular shift manner, wherein k=64 and the maximum shifting gates are n=4 in each shift level. Since the shift amount k/2=32 is already implemented in the pipe stage 1, only shift amounts with in total 31 are required. The first shift level 100 allows the shifting amounts 0, 8, 16, 24, each with a distance of k/(2n)=8 between two shifting gates next to each other. The second shift level 110 allows the amounts 0, 2, 4, 6, each with a distance of k/(2nn)=2 between two shifting amounts next to each other. In the third and last shift level 120, only shifting amounts of 0 and 1 are necessary.

Accordingly, another shift unit 10 with a circular shift manner, wherein k=128 and the maximum shifting amount is n=4 in each shift level would require the following shift levels. The first shift level 100 allows the shifting amounts 0, 16, 32, 48, each with a distance of k/(2n)=16 between two shifting amounts next to each other. The second shift level 110 allows the amounts 0, 4, 8, 12, each with a distance of k/(2nn)=4 between two shifting amounts next to each other. In the third and last shift level 120, shifting amounts of 0, 1, 2 and 3 are necessary.

When k/2 bit data have to be shifted, the shifting structure requires as an additional feature a duplication function within the multiplexing unit 40, allowing to duplicate the content from register A REG into register B REG, and vice versa. Duplication might be necessary, e.g. for IBM S/390 instructions such as: insert character under mask (ICM), compare logical characters under mask (CLM), store characters under mask (STCM), or truncation (TRUNC) functions and for all shifts applying parity prediction.

Shifting in a circular manner requires a certain treatment in order to receive the same result as from a linear shifting. In a preferred embodiment of the invention, such a treatment is done by an individual string of bit values. The shift amount is decoded to the bit string which defines the valid bits of the shift result and also allows to control the optional parity prediction. It defines the validity of the data and optionally selects the parity bits for the parity prediction.

Example: A 64 Bit Shift Unit

An example of an embodiment will now be given in order to explain the invention in greater detail. The embodiment comprises a structure according to FIG. 2 with a 64 bit shift unit. The shift unit of the example is able to perform:

1) Shifts of 4 byte or 8 byte operands to the left or right. The shifts can be arithmetical shifts (sign extension required) or logical shifts. The shift amount varies between 0–63 bits.

2) Byte operations like IBM S/390 instruction Insert Character under a Mask ICM. Bytes from a contiguous field in storage equal to the length of the number of 1's in the mask are rearranged according to the position of the 1's in the mask. The operand length is up to 4 bytes. See also Table 4.

| Example | Storage operand | ABC |
| | Mask | 1101 |
| | Result | AB0C |

3) The IBM S/390 instructions Store character under a mask (STCM): Bytes from a register are selected according to the mask and stored at contiguous byte locations in the storage. See also Table 5.

| Example | Register | ABCD |
| | Mask | 0110 |
| | Result | 00BC |

4) Truncation: 4 Byte operands are truncated on the left or right side. The truncation amount can be 0–31.

Shifting Structure of the Example

The above functions can be done through a shifting element applying 6 levels of multiplexers, whereby a Level 1 is able to perform a shift amount of 32 to the left or right or passing the data straight through. Additional levels perform shift amounts of 16, 8, 4, 2, 1. However, the signals then have to pass through 6 levels of logic to get the result. This is quite time consuming and a great disadvantage.

Figure 4A:
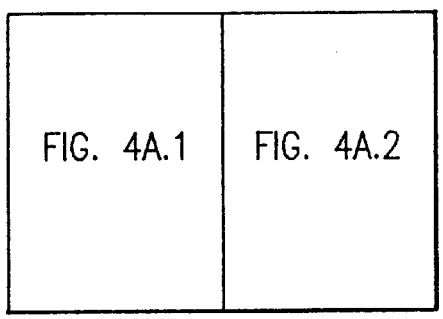
FIG. 4a shows the structure of one embodiment of the shift unit 10 with a circular shift manner and parts 30a of the optional parity prediction unit 30.
Figure 4B:
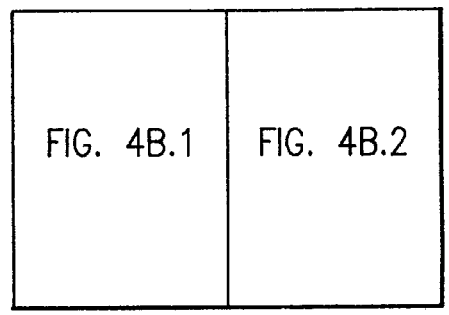
FIG. 4b shows the structure of an embodiment of parts 30b of the optional parity prediction unit 30 and of the optional parity generation unit 20.

FIG. 4a shows the structure of one embodiment of the shift unit 10 with a circular shift manner and parts 30a of the optional parity prediction unit 30. FIG. 4b shows the structure of an embodiment of parts 30b of the optional parity prediction unit 30 and of the optional parity generation unit 20. Only 3 levels of multiplexers perform the functions of Table 1. The data are provided in the A and B Registers according to Table 1. Pipe stage 1 in FIG. 2 is able to provide the data as expected in Table 1. This is necessary for the shifting unit of pipe level 2.

Shift Unit 10 of the Example

The shift unit 10 can perform all required functions with 3 multiplexer levels, see FIG. 4a. Shifts with a shift amount SA>=32 are reduced in the first pipe stage already to shifts with an amount 0–31. Three levels (SU level 1–3) of multiplexers are necessary to perform all shifts with SA 0–31 and in addition some more functions like the IBM S/390 instructions ICM, CLM, STCM and a variety of micro instructions. SU level 1 does the byte shifts (8, 16, 24 to the left). These shifting levels are necessary for all byte shifts and especially for operations controlled by a mask, like ICM or STCM. SU level 2 does left shifts of 2, 4, or 6 bits, and level 3 does only a shift of 1.

All 3 levels can be bypassed by activating the input STRAIGHT. Bits of the shift result are forced to zero by deactivating all gate signals at SU level 3. An AUXILIARY input is used to do the sign extension in case of arithmetical shift rights or to insert the sign in case of arithmetical shift left. All byte shifts are done at shift level 1, whereas all shifts with amount<=7 are done in level 2 and 3. For example, the ICM/STC needs only shift level 1, see Tables 4 and 5.

Embodiment of a String in the Example

The shift amount is decoded to a bit string which defines the valid bits of the shift result and controls parity prediction. The string defines the validity of the data and selects the parity bits for the parity prediction, see Table 3.

Table 1 shows the function of the control string S. The string is 32 bit wide, but controls the shift unit result of up to 64 bits. This is due to the fact that the second halve of the string is either completely '0' or completely '1'. Logically the string can be considered as a string of 64 bits. For logical shifts, where vacated bit positions are replaced by zeroes, or arithmetical shifts, where the sign bit is extended (shift right arithmetical, SRA) the control string S(i) i=0–63 is applied, to define the leading zeroes or to define bit positions carrying the sign. The control string S is generated from the shift amount SA, e.g. if SA=16 then Si=1 with i=0–47 and Sj =0 with j=48–63. The string S contains 48 1's at the left and 16 zeroes at the right side. Each bit position i of Si controls the bit position i of level 3 of the shift unit, as apparent from FIG. 4. If none of the inputs (STRAIGHT, LEFT 1, AUXILIARY) is activated the output of the MUXi is zero.

For shift left logical, the string can be directly applied. For shift right logical, the string is swapped, so that 16 zeroes are at the left and 48 1's at the right side, considering the above example.

For arithmetical shifts where the sign is extended (shift right arithmetical, SRA) or the original sign keeps its position (shift left arithmetical, SLA) the AUXILIARY input of MUX level 3 is used to force the sign bit. In case of SRA the sign is forced to all bit positions where S(i) i=0–63 carries a zero.

Table 1 shows IBM S/390 shift instructions, the applied control string S, and the appropriate result in A REG and B REG of the operation in pipe level 1. It is assumed that double shifts access the operand ABCD EFGH and 4 byte shifts access only ABCD, whereby A–H represent a byte each.

String support for parity prediction in the example

In FIG. 4b the parity prediction logic greatly reduces the amount of control logic which is generally necessary for parity prediction. The generated double word parity (signal +GENERATED DOUBLE WORD PARITY) is compared with a predicted double word parity. For that, the parity bits of the original shift operand are selected according to the control string S, see Table 2. The selected parity bits generate a predicted double word parity which is again manipulated by sign insertion (in case of arithmetic shift left) or sign extension (in case of arithmetic shift right) and by the partially shifted out bits (signal PARITY OF PART. SHIFTED BYTE).

For right shifts, the bits 7, 15, 23, and 31 of the swapped control string define the parity bits of the original operand to be taken for parity prediction. For left shifts, the control string bits 0, 8, 16 and 24 define the parity bits for the prediction.

TABLE 1

Tables
Overview of IBM S/390 shift instructions, applied string and expected operand in second pipe stage.

| Instruction | Shift amount | String | A REG | B REG |
|---|---|---|---|---|
| SLL | >= 32 | 0000 0000 | xxxx | xxxx |
| SLL | <32 | ssss 0000 | ABCD | xxxx |
| SLDL | >= 32 | ssss 0000 | EFGH | xxxx |
| SLDL | <32 | 1111 ssss | ABCD | EFGH |
| SLA | >= 32 | 0000 0000 v | xxxxx | xxxx |
| SLA | <32 | ssss 0000 v | ABCD | xxxx |
| SLDA | >= 32 | ssss 0000 v | EFGH | xxxx |
| SLDA | <32 | 1111 ssss | ABCD | EFGH |
| SRL | >= 32 | 0000 0000 | xxxx | xxxx |
| SRL | <32 | cccc 0000 | ABCD | ABCD |
| SRDL | >= 32 | 0000 cccc | ABCD | EFGH |
| SRDL | <32 | cccc 1111 | EFGH | ABCD |
| SRA | >= 32 | 0000 0000 vvvv | xxxx | xxxx |
| SRA | <32 | cccc 0000 v.. | ABCD | ABCD |
| SRDA | >= 32 | 0000 cccc vvvv v... | ABCD | EFGH |
| SRDA | <32 | cccc 1111 v.. | EFGH | ABCD |
| TRUNC Right | <32 | 0000 ssss | ABCD | ABCD |
| TRUNC left | <32 | 0000 cccc | ABCD | ABCD |
| ICM/STCM |  | 1111 0000 | ABCD | ABCD |

Legend: s: valid bits of the control string
c: valid bits of swapped control string
v: sign bit in case of arithmetical shifts
x: Don't care
original data ABCD if 4 byte operand
original data ABCD EFGH if 8 byte operand

TABLE 2

Overview of selected operand parity bits for parity prediction

| Instruction | Shift amount | A REG parity P0 | P1 | P2 | P3 | B REG parity P4 | P5 | P6 | P7 |
|---|---|---|---|---|---|---|---|---|---|
|  |  | control string applied |  |  |  |  |  |  |  |
| SLL,SRL,SLA,SRA | >=32 | 1 | 1 | 1 | 1 | 1 | 1 | 1 | 1 |
| SLL | <32 | 24 | 16 | 8 | 0 | 1 | 1 | 1 | 1 |
| SLDL | >=32 | 24 | 16 | 8 | 0 | 1 | 1 | 1 | 1 |
| SLA | <32 | 24 | 16 | 8 | 0 | 1 | 1 | 1 | 1 |
| SLDA | >=32 | 24 | 16 | 8 | 0 | 1 | 1 | 1 | 1 |
| SLDL | <32 | 24 | 16 | 8 | 0 | t | t | t | t |
| SLDA | <32 | 24 | 16 | 8 | 0 | t | t | t | t |
|  |  | swapped control string applied |  |  |  |  |  |  |  |
| SRL | <32 | 31 | 23 | 15 | 7 | 1 | 1 | 1 | 1 |
| SRDL | >=32 | 31 | 23 | 15 | 7 | 1 | 1 | 1 | 1 |
| SRA | <32 | 31 | 23 | 15 | 7 | 1 | 1 | 1 | 1 |
| SRDA | >=32 | 31 | 23 | 15 | 7 | 1 | 1 | 1 | 4 |
| SRDL | <32 | 31 | 23 | 15 | 7 | t | t | t | t |
| SRDA | <32 | 31 | 23 | 15 | 7 | t | t | t | t |

Legend:
Pi i = 0–7 parity of original operand
1: appropriate parity bit forced to one
t: parity bit taken

TABLE 3

Decoding of the shift amount into a string of 32 bits

| Shift amount | String 0–31 |
|---|---|
| 0 | 11111111111111111111111111111111 |
| 1 | 11111111111111111111111111111110 |
| 2 | 11111111111111111111111111111100 |
| 3 | 11111111111111111111111111111000 |
| 4 | 11111111111111111111111111110000 |
| 5 | 11111111111111111111111111100000 |
| 6 | 11111111111111111111111111000000 |
| 7 | 11111111111111111111111110000000 |
| . | . |
| . | . |
| . | . |
| 30 | 11000000000000000000000000000000 |
| 31 | 10000000000000000000000000000000 |

TABLE 4

Shift operations for Insert Character under Mask, Pipe stage 2.

| ICM | A Reg By0 | By1 | By2 | By3 | B Reg By4 | By5 | By6 | By7 | Mask |
|---|---|---|---|---|---|---|---|---|---|
|  |  |  |  |  |  |  |  |  | 0000 |
|  |  |  |  |  |  |  |  | ST | 0001 |
|  |  |  |  |  |  |  |  | L8 | 0010 |
|  |  |  |  | ST |  |  |  | ST | 0011 |
|  |  |  |  |  |  |  |  | L16 | 0100 |
|  |  |  |  | L8 |  |  |  | ST | 0101 |
|  |  |  |  | L8 |  |  |  | L8 | 0110 |
|  |  |  | ST | ST |  |  |  | ST | 0111 |
|  |  |  |  |  |  |  |  | L24 | 1000 |
|  |  |  |  | L16 |  |  |  | ST | 1001 |
|  |  |  |  | L16 |  |  |  | L8 | 1010 |
|  |  | L8 |  | ST |  |  |  | ST | 1011 |
|  |  |  |  | L16 |  |  |  | L16 | 1100 |
|  | L8 |  |  | L8 |  |  |  | ST | 1101 |
|  | L8 |  |  | L8 |  |  |  | L8 | 1110 |
| ST | ST |  |  | ST |  |  |  | ST | 1111 |

Legend:
ST: appropriate Byte moved straight
L8, L16, L24: appropriate Byte shifted left 8, 16, 24

TABLE 5

Shift operations for Store Character under Mask, Pipe stage 2.

| STCM | A Reg | | | | B Reg | | | | Mask |
|------|-----|-----|-----|-----|-----|-----|-----|-----|------|
|      | By0 | By1 | By2 | By3 | By4 | By5 | By6 | By7 |      |
|      |     |     |     |     |     |     |     |     | 0000 |
|      |     |     |     | ST  |     |     |     |     | 0001 |
|      |     |     | X   |     |     |     | L24 |     | 0010 |
|      |     | ST  | ST  |     |     |     |     |     | 0011 |
|      |     |     | X   |     |     | L16 |     |     | 0100 |
|      | X   | ST  |     |     | L24 |     |     |     | 0101 |
|      | X   | X   |     |     | L24 | L24 |     |     | 0110 |
|      | ST  | ST  | ST  |     |     |     |     |     | 0111 |
|      |     |     | X   | L8  |     |     |     |     | 1000 |
|      | X   | ST  |     |     | L16 |     |     |     | 1001 |
|      | X   | X   |     |     | L16 |     | L24 |     | 1010 |
|      | X   | ST  | ST  |     | L24 |     |     |     | 1011 |
|      | X   | X   |     |     | L16 | L16 |     |     | 1100 |
|      | X   | X   | ST  |     | L24 | L24 |     |     | 1101 |
|      | X   | X   | X   |     | L24 | L24 | L24 |     | 1110 |
|      | ST  | ST  | ST  | ST  |     |     |     |     | 1111 |

Legend:
ST: appropriate Byte moved straight
L8, L16, L24: appropriate Byte shifted left 8, 16, 24 from B Reg
X: Position, where the appropriate Byte is shifted to.

Further Examples

EXAMPLE 1)

Shift left double SLDL (8 byte operand from register pair Ri, Ri+1, i=even) with shift amount SA<32

RA addresses register Ri and RB addresses register Ri+1. Thus the original operand ABCD EFGH is put to AREG as ABCD and BREG as EFGH.

```
SA = 8:  original Opnd.  X'01 23 45 67  89 AB CD EF'
         result pipe 1   X'01 23 45 67  89 AB CD EF'
         shifted Opnd.   X'23 45 67 89  AB CD EF 01'
         String S        X'FF FF FF FF  FF FF FF 00'
         Shifter output  X'23 45 67 89  AB CD EF 00'
```

EXAMPLE 2)

SLDL with SA>=32

RA addresses Ri+1 and RB addresses Ri. Thus the AREG contains EFGH and BREG contains ABCD. A circular shift of 32 bit positions has taken place, without adding delay. The original operand ABCD EFGH is read to A/BREG as EFGH ABCD.

```
SA = 48:  orig. Opnd.    X'01 23 45 67  89 AB CD EF'
          result pipe 1  X'89 AB CD EF  01 23 45 67'
          shifted Opnd.  X'CD EF 01 23  45 67 89 AB'
          String S       X'FF FF 00 00  00 00 00 00'
          Shifter output X'CD EF 00 00  00 00 00 00'
```

EXAMPLE 3)

Shift right double SRDL (8 byte) with SA<32

RA addresses Ri+1 and RB addresses Ri. Thus the original data ABCD EFGH appear in the AREG as EFGH and BREG as ABCD. This swap is necessary as shifting right is done by a circular left shift with the complement of the shift amount. As shift 32 is done in pipe 1, CSA=32-SA.

```
SA = 20:  orig. Opnd.    X'01 23 45 67  89 AB CD EF'
CSA = 12: result pipe 1  X'89 AB CD EF  01 23 45 67'
          shifted Opnd.  X'BC DE F0 12  34 56 78 9A'
          String S       X'FF F0 00 00  FF FF FF FF'
          String S swapped X'00 00 0F FF  FF FF FF FF'
          Shifter output X'00 00 00 12  34 56 78 9A'
```

EXAMPLE 4)

Shift right double arithmetic SRDA (8 byte) with SA<32

RA addresses Ri+1 and RB addresses Ri. Thus the original data ABCD EFGH appear in the AREG as EFGH and BREG as ABCD. This swap is necessary as shifting right is done by a circular left shift with the complement of the shift amount. As shift 32 is done in pipe 1, CSA=32-SA. In arithmetical shifts the sign has to be extended. All bit positions of the string S carrying zero point to bit positions where the sign is extended to. The sign is forced at the AUXILIARY input of SU level 3.

```
SA = 20:  orig. Opnd. (neg.) X'81 23 45 67  89 AB CD EF'
CSA = 12: result of pipe 1   X'89 AB CD EF  81 23 45 67'
          shifted Opnd.      X'BC DE F8 12  34 56 78 9A'
          String S           X'FF F0 00 00  FF FF FF FF'
          String S swapped   X'00 00 0F FF  FF FF FF FF'
          Shifter output     X'FF FF F8 12  34 56 78 9A'
```

EXAMPLE 5)

Shift right arithmetical SRA (4 byte) with SA=19

For all instructions executed by the shift unit 10 which apply only 4 byte, RA and RB address the same register. Thus the operand is duplicated to the AREG and BREG. Duplication is also necessary for parity prediction. The bits shifted out of the partially shifted byte are sensed only at shift unit byte 0 position, see FIGS. 4. Table 6 shows as an example the shift right arithmetical SRA (4 byte) operation with SA=19.

EXAMPLE 6) SRA with SA<32 of Example 5

Table 2 shows the selection of the parity bits which take part in the parity prediction. As in example 5 as above, SRA with SA<32 is explained. The byte parity is assumed to be odd.

Table 7 shows as an example a shift right arithmetical SRA (4 byte) operation with SA<32. Bit position CSA (31, 23) select P0=1 and P1=0, P2, P3, and P4–P7 forced 1. The predicted double word parity PD is composed of P0–P7. Since the shift amount SA is odd, an odd number of sign bits are extended. Furthermore the parity of the partially shifted byte has to be considered for the final predicted parity.

TABLE 6

Shift right arithimtical SRA (4 byte) with SA = 19.

| SA = 19 | orig. Opnd | X'A5 B6 C7 D8' | | | | | | |
|---|---|---|---|---|---|---|---|---|
| CSA = 13 | result of pipe 1 | X'A5 B6 C7 D8 | | A5 B6 C7 D8' | | | | |
| Bit position: | | 111111 | 11112222 | 22222233 | 33333333 | 44444444 | 44555555 | 55556666 |
| | 01234567 | 89012345 | 67890123 | 45678901 | 23456789 | 01234567 | 89012345 | 67890123 |
| pipe 1 | B'10100101 | 10110110 | 11000111 | 11011000 | 10100101 | 10110110 | 11000111 | 11011000' |
| shft 8 lvl 1 | B'10110110 | 11000111 | 11011000 | 10100101 | 10110110 | 11000111 | 11011000 | 10100101' |
| | ** | | | | | | | |
| shft 4 lvl 2 | B'01101100 | 01111101 | 10001010 | 01011011 | 01101100 | 01111011 | 10001010 | 01011011' |
| | * | | | | | | | |
| shft 1 lvl 3 | B'11011000 | 11111011 | 00010100 | 10110110 | 11011000 | 11110111 | 00010100 | 10110110' |
| SA | B'11111111 | 11111111 | 11100000 | 00000000 | 00000000 | 00000000 | 00000000 | 00000000' |
| CSA | B'00000000 | 00000000 | 00011111 | 11111111 | 11111111 | 11111111 | 11111111 | 11111111' |
| result | B'00000000 | 00000000 | 00010100 | 10110110 | 11011000 | 11110111 | 00010100 | 10110110' |
| sign ext. | B'11111111 | 11111111 | 111----- | -------- | -------- | -------- | -------- | -------- |
| final result | B'11111111 | 11111111 | 11110100 | 10110110 | 11011000 | 11110111 | 00010100 | 10110110' |

The asterisk (*) shows the bits of the partially shifted byte X'B6' which are used for parity prediction.

TABLE 7

Shift right arithmetical SRA with SA < 32

| SA = 19 | orig. Opnd | | X'A5 B6 C7 D8' | | | | | | |
|---|---|---|---|---|---|---|---|---|---|
| | Parity | | 1 0 0 1 | | | | | | |
| CSA = 13 | result of pipe 1 | A REG = X'A5 B6 C7 D8' | | | | B REG = X'A5 B6 C7 D8' | | | |
| | parity | 1 0 0 1 | | | | 1 0 0 1 | | | |
| Bit position: | | 111111 | 11112222 | 22222233 | 33333333 | 44444444 | 44555555 | 55556666 | |
| | 01234567 | 89012345 | 67890123 | 45678901 | 23456789 | 01234567 | 89012345 | 67890123 | |
| pipe 1 | B'10100101 | 10110110 | 11000111 | 11011000 | 10100101 | 10110110 | 11000111 | 11011000' | |
| parity | P0 = 1 | P1 = 0 | P2 = 0 | P3 = 1 | P4 = 1 | P5 = 0 | P6 = 0 | P7 = 1 | |
| SA | B'11111111 | 11111111 | 11100000 | 00000000 | 00000000 | 00000000 | 00000000 | 00000000' | |
| CSA | B'00000000 | 00000000 | 00011111 | 11111111 | 11111111 | 11111111 | 11111111 | 11111111' | |

We claim:

1. A shift structure for executing shifting operations comprising:
    a data store (DLS) containing data (R0–R3) which can be read out individually or in a combination into a plurality of operand registers (A REG, B REG); and
    a shift unit (10) coupled to the output of the operand registers (A REG, B REG);
    characterised by
        a multiplexing unit (40) coupled to the output of the data store (DLS) for providing at least one shifting operation, when required, by placing the read out data (R0–R3) to be shifted in the plurality of operand registers (A REG, B REG);
    said shift structure further comprising two successive pipeline stages, wherein the data store (DLS) and the multiplexing unit (40) are in a first one of said pipeline stages, and the shift unit (10) is in a second one of said pipeline stages.

2. The shift structure of claim 1, characterised in that the data store (DLS) containing data (RO–R3), each having a maximum k/2 bit length, which can be read individually or as pairs with maximum k bit length into a pair of the operand registers (A REG, B REG), each with k/2 bit length; and
    the shift unit (10) with k bit length is coupled to the pair of operand registers (A REG, B REG) and comprising a plurality of shifting elements;
    the multiplexing unit (40) providing a k/2 bit shifting, when required, by placing each one of the k/2 bit data (R0–R3) to be shifted in at least one of the operand registers (A REG, B REG); and
    the shift unit (10) only requires shifting elements with a maximum shift amount of k/4.

3. The shift structure according to claim 1, characterised in that the multiplexing unit (40) comprises a duplication unit for duplicating the contents of the operand registers (A REG, B REG).

4. A shift unit (10) with k bit length which can be used in the shift structure according to claim 1, whereby the shift unit (10) executes shifting operations in only one direction in a circular manner, characterized in that:
    the shift unit (10) comprises a plurality of consecutive shift levels each comprising a number n, p, q, etc. of shift gates, each with different shift amounts, whereby n, p, q, etc. and the shifting amounts represent integer values,
whereby
    in a first shift level, the shift gates comprise the shift amounts 0, k/2(n), 2 * k/2(n), 3 * k/2(n), 4 * k/2(n), . . . ,(n−2) * k/2(n), (n−1) * k/2(n), each with a distance of k/2(n) between two shifting amounts next to each other; and
    in each consecutive shift level the distance between two shifting amounts, next to each other, is divided into k/2 (π), whereby π0 represents the product of the number of shift gates in the preceding shift levels up to the present shift level.

5. The shift unit (10) of claim 4, characterised in that the last shift level ends with a shifting amount of 1.

6. The shift unit (10) according to claim 4, characterised by a string comprised of individual bit or byte values for correcting the circular shift result into a linear shift result, whereby the shift amount to be shifted is decoded to the string defining the valid bits of the shift result.

7. The shift unit (10) according to claim 6, further comprising a parity prediction unit (30).

8. The shift unit (10) according to claim 7, characterised in that in the prediction unit (30) the counting of the bits which are shifted out of a partially shifted byte is accomplished only on one side.

9. The shift unit (10) according to claim 8, characterised in that in the prediction unit (30) the counting of the bits which are shifted out of a partially shifted byte is accomplished only on the side to which the bits are shifted to in a circular manner.

10. The shift unit (10) according to claim 7, characterised in that the string allows to control a parity prediction by selecting parity bits for the parity prediction in the parity prediction unit (30).

11. An execution unit for executing data manipulations in a processor unit characterized by a shift unit (10) according to claim 1.

12. A processor chip characterized by a an execution unit according to claim 11.

13. A method for executing a shifting operation comprising the steps of:

reading out an operand to be shifted from a data store (DLS);

putting the operand, by a multiplexing unit (40), into a plurality of operand registers (R0–R3), thus executing at least one partial shift, when required;

shifting the operand by a shift unit (10) by executing the remaining partial shifts;

wherein the steps of reading out the operand to be shifted and putting the operand into a plurality of operand registers are executed in a first pipe stage and during a first cycle; and the step of shifting the operand by a shift unit (10) by executing the remaining partial shifts is executed in a second pipe stage during a next cycle.

14. The method of claim 13, wherein:

the operand to be shifted is put into one of a pair of the operand registers, each k/2 bits long with k representing an integer value, thus executing a k/2 bit shift when required;

the shifting of the operand is executed by consecutive shifting of the remaining partial shifts in a k bits long shift unit.

15. The method of claim 14, wherein for shifting with a shift amount greater than or equal to k/2 to the left or right, only the rightmost or leftmost k/2 data word respectively, is read out in to the most left or right one of the pair of operand registers respectively, representing a k/2 shift during the cycle in the first pipe stage.

16. Use of the method according to claim 13 in an execution unit for executing data manipulations in a processor unit.

17. Use of the method according to claim 13 in a processor chip.

18. A shift structure for executing shifting operations comprising:

a data store (DLS) containing data (R0–R3) which can be read out individually or in a combination into a plurality of operand registers (A REG, B REG); and a shift unit (10) coupled to the output of the operand registers (A REG, B REG), said shift unit capable of shifting the output of said operand registers by a predetermined shift amount (SA), said shift unit further deriving from said predetermined shift amount (SA) a control string, said control string being used to correct the output of said shift unit.

19. The shift structure of claim 18, wherein the control string is comprised of individual bit values for correcting a circular shift result into a linear shift result.

20. The shift structure of claim 18, wherein the control string is comprised of individual bit values for controlling a parity prediction unit by selecting parity bits.

* * * * *